United States Patent Office 3,520,179
Patented July 14, 1970

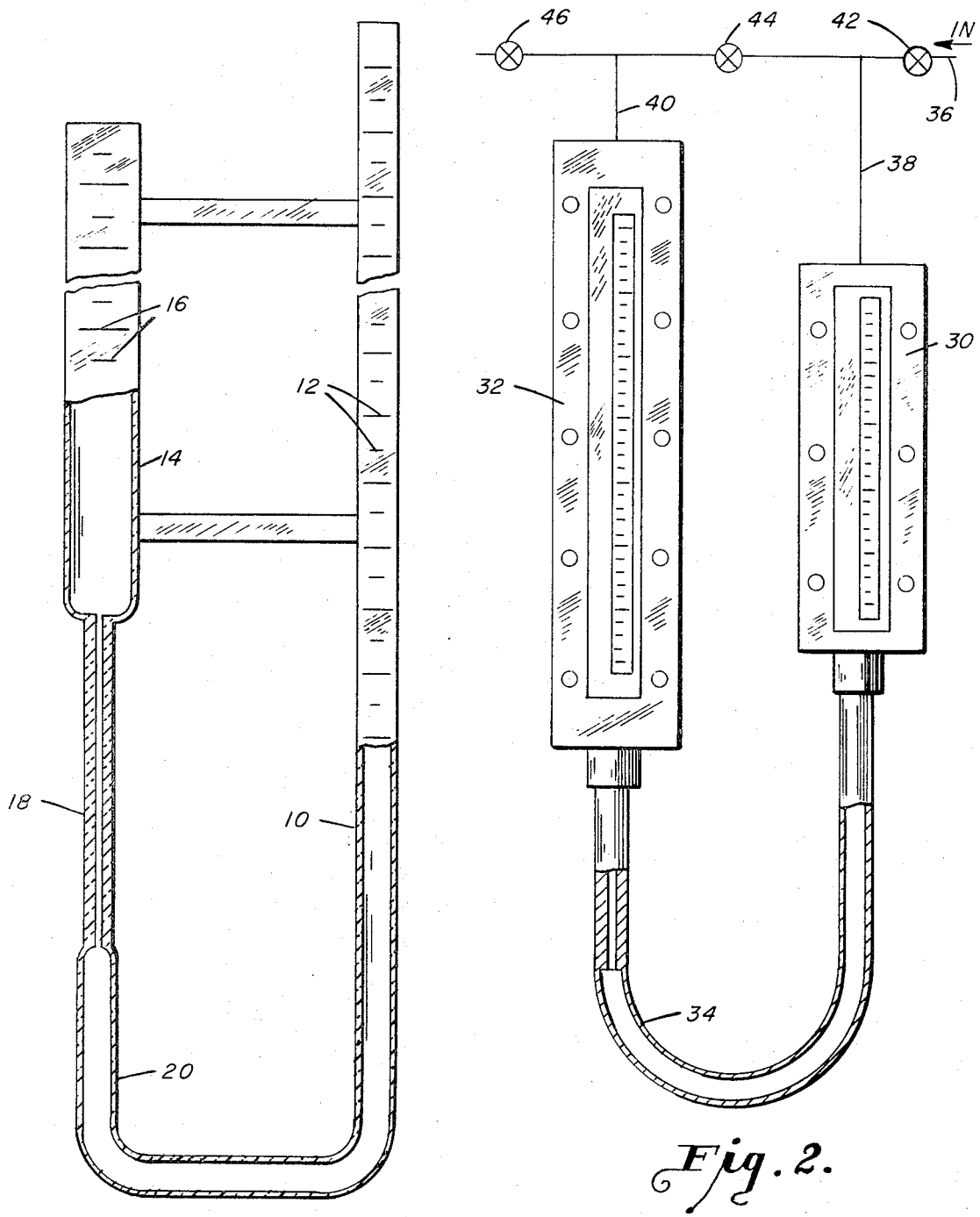

3,520,179
VARIABLE HEAD RHEOMETER FOR MEASURING NON-NEWTONIAN FLUIDS
John C. Reed, 4323 E. 40th Place,
Tulsa, Okla. 74135
Filed June 19, 1968, Ser. No. 738,285
Int. Cl. G01n *11/06*
U.S. Cl. 73—55                                                     1 Claim

ABSTRACT OF THE DISCLOSURE

A rheometer or viscometer having a capillary flow tube between a recipient vessel and an efflux vessel measures accurately the viscosity of non-Newtonian fluids. The ability to measure and its accuracy is a function of the calibration spacings on the vessels.

BACKGROUND OF THE INVENTION

This invention relates to a capillary rheometer or viscometer for non-Newtonian fluids, i.e., fluids whose viscosity is not constant with shear rate, time of shearing or other variables. Typical examples are drilling muds, polymer solutions, paints, printing inks, slurries, natural gum solutions and food substances. Capillary-type viscometers have been proposed heretofore such as in U.S. Pats. 1,405,538; 1,467,461; 1,633,352; 2,048,305; 2,095,282; and 3,277,694. The devices, however, of these patents have been found not suitable for the reasons that either they are not capable of giving mathematically defined flow for non-Newtonian fluids and/or there is no provision for accurately measuring the head of fluid as it flows. Additionally, the reference devices do not provide for determination of more than one flow rate through the capillary restriction.

SUMMARY

This invention teaches a rheometer or viscometer for measuring non-Newtonian solutions accurately and comprises a substantially upright apparatus having a capillary and flow tube between a recipient vessel of substantially constant cross-sectional area and a substantially constant cross-sectional area efflux vessel. The efflux vessel and recipient vessel are calibrated with suitable spaced indicia for determining viscosity.

This invention further discloses formulation to design a viscometer of the type above described for non-Newtonian fluids. The apparatus is adaptable to gravity flow or pressure flow conditions.

BRIEF DESCRIPTION OF THE DRAWINGS

FIG. 1 is a sectional front elevation view of a variable head viscometer of this invention.

FIG. 2 is an alternate embodiment of a variable head viscometer where pressure is used to assist flow.

DESCRIPTION OF THE PREFERRED EMBODIMENT

Referring now to FIG. 1, the apparatus of this invention comprises a generally upright system having an efflux tube 10 of substantially constant cross-sectional area. This tube is properly calibrated with indicia or graduation markers 12 spaced so that the average head change is not great during a measuring interval. Substantially opposite the efflux tube 10 is a recipient tube 14 of substantially constant cross-sectional area and likewise having calibrations 16 in connection therewith for use in making equilibrium calculations. In the preferred embodiment and located immediately below the recipient tube 14 is a capillary tube 18 of defined length and size. Interconnecting the bottom of the capillary tube and the efflux tube 10 is a tubing connection 20 to provide communication therebetween. This latter tubing need not be of a constant cross-sectional area since it only serves as a conduit of fluids from the calibrated efflux tube through the capillary tube to the substantially constant cross-sectional recipient tube.

Referring now to FIG. 2, the apparatus of this invention as modified includes an efflux vessel 30 and a recipient vessel 32 interconnected by tubing 34. The tubing 34 itself may form the capillary portion of the apparatus or it may be separately formed as shown in FIG. 2. The recipient and efflux vessels 32 and 30 are formed with a known high pressure sight glass and gage such as sold under the trademark Jerguson or Penberthy. A fluid pressure conduit 36 is interconnected to the efflux tube by conduit 38 and to the recipient tube by conduit 40. Valves 42, 44 and 46 provide flow control of the fluid pressure as desired.

VISCOMETER DESIGN

The operating characteristics of the instruments of this invention are based on mathematical analysis which allows for design of the substantially constant cross-sectional area efflux and recipient tubes. The volume of fluid in either of the tubes is directly proportional to the fluid height therein and the amount of fluid leaving the substantially constant cross-sectional efflux tube is the same as that entering the recipient tube. At equilibrium the fluid height is the same in the efflux tube and the recipient tube. The instantaneous flow rate in the viscometer can be found with sufficient accuracy simply by timing the elapsed time between two level or indicia on the calibrated efflux tube with a stopwatch:

$$dQ_2/dt = (Q_2^{(1)} - Q_2^{(2)})/\Delta t \qquad (1)$$

where:

$Q_2^{(1)}$ = instantaneous volume in efflux vessel at initial time on stopwatch (cm.$^3$).
$Q_2^{(2)}$ = instantaneous volume in efflux vessel at elapsed time $\Delta t$ on stopwatch (cm.$^3$).
$dQ/dt$ = instantaneous flow rate (cm.$^3$/sec.).
$\Delta t$ = elapsed time, sec.

The average head during this time interval is then given as:

$$\Delta P = \rho g \left(\frac{1}{A_1} + \frac{1}{A_2}\right)(1/2(Q_2^{(1)} + Q_2^{(2)}) - Q_2^*) \qquad (2)$$

where:

$\Delta P$ = pressure drop across capillary tube (dyne/cm.$^2$).
$\rho$ = density of fluid in viscometer (gm./cm.$^3$).
$g$ = gravitational acceleration (cm./sec.$^2$).
$A_1$ = area of constant bore recipient vessel above capillary tube (cm.$^2$).
$A_2$ = area of calibrated scale efflux vessel (cm.$^2$).
$Q_2^*$ = equilibrium volume of efflux vessel (cm.$^3$).

For any given non-Newtonian fluid, the wall shear stress and shear rate can be given by the well known equations:

$$T_w = \Delta P(D/4L) \qquad (3)$$

$$\Gamma_w = ((3n'+1)/4n')(32/\pi D^3)(dQ_2/dt) \qquad (4)$$

where:

$T_w$ = Fluid shear stress at wall of capillary tube (dynes/cm.$^2$).
$D$ = diameter of capillary tube (cm.).
$L$ = Length of capillary tube (cm.).
$\Gamma_w$ = shear rate of fluid at wall of capillary tube (sec.$^{-1}$).
$n'$ = slope of plot of log $I_w$ versus log $$((32/\pi D^3)(dQ/dt))$$

The ratio of $T_w/(\Gamma_w)$ being the well known "apparent" viscosity ($\mu a$) is equivalent to the viscosity of a Newtonian fluid at this same shear rate. The fractional deviation or change of the visiosity head during a reading can be given as:

$$\delta = \frac{Q_2^{(1)} - Q_2^{(2)}}{\frac{1}{2}[Q_2^{(1)} + Q_2^{(2)}] - Q_2^*} = \frac{\Delta Q}{Q_2^{(1)} - \frac{1}{2}\Delta Q - Q_2^*} \quad (5)$$

where: $\Delta Q = Q_2^{(1)} - Q_2^{(2)}$

For any given fractional change of head, $\delta$, the apparent viscosity will determine the time required for an appropriate volume change.

$$\delta \mu a / \Delta t = (\rho g D / 4L) \left(\frac{1}{A_1} + \frac{1}{A_2}\right) \bigg/ \left[\left(\frac{32}{\pi D^3}\right)\left(\frac{3n'+1}{4n'}\right)\right] \quad (6)$$

By correctly choosing the values of $A_2$, $A_1$, D and L, it is possible to keep the fractional change in head within any specified limits for any given non-Newtonian fluid and time measurement interval. The time measurement interval can also be decreased with more viscous materials by decreasing the interval between calibration marks on the efflux vessel scale.

In preferred practice a set of several instruments of convenient dimensions are constructed and the operator uses that instrument which will cover the range of apparent viscosity of the particular fluids to be measured with the desired degree of accuracy. The advantage of using a design according to Equation 6 above is that elaborate calculations involving numerical or graphical differentiation are avoided. The viscometer can be made as simple to operate for non-Newtonian fluids as the Ostwald-type is for Newtonian fluids.

Calibration constants for both types of variable head viscometers of this invention are shown in the following table:

is then found by calibration by a known Newtonian fluid such as water.

Additional constant gas pressure differential can be used as an alternate embodiment as in FIG. 2 to increase the range of the instrument design. An instrument designed by Equation 6 for a given fractional change in head will operate even more satisfactorily under constant pressure differential. In some instances inclination of the efflux tube will allow accurate readings of small pressure differentials but will not affect the accuracy of the measurements. An instrument designed for a given fractional change in head will give the same fractional change whether the efflux tube is vertically upright or canted at an angle.

In addition to the normal calibrated scale on the efflux vessel, a desirable feature of this invention is a calibrated scale on the recipient vessel. This allows an operator to determine the equilibrium height of the fluid without the necessity of actually awaiting equilibrium conditions to exist. This is especially valuable when measuring highly viscous solutions at low shear rates where a long time would be required to reach an equilibrium condition. In this case, it can be shown that the equilibrium height can be calculated when the height in both the recipient and efflux vessels is measured at the same instant. Since the two calibrated scales of each vessel might not have the same starting point, the relationship between the height in the recipient vessel $M_1^*$ relative to the height in the efflux vessel $M_2^*$ an equilibrium is:

$$M_1^* = M_2^* + \Delta M_2^* \quad (7)$$

where $\Delta M_2^*$ accounts for the difference in zero scale heights. Since the same amount of fluid flows out of the

TABLE I

| No. | $\left(\frac{1}{A_1}+\frac{1}{A_2}\right)\frac{cm.}{ml.}$ | $\rho$q. D/4L dynes/ cm.$^2$/cm. H$_2$O | $\frac{32}{\pi D^3}$ cm.$^{-3}$ | $\alpha_1 \frac{dynes/cm.^2}{(ml./sec.)^2}$ | D, cm. | L/D |
|---|---|---|---|---|---|---|
| 1 | 4.02 | 3.12 | 55,400 | 0 | .0597 | 79.2 |
| 2 | 1.22 | 33.8 | 47,800 | 4,450 | .0679 | 7.20 |
| 3 | 1.31 | 5.20 | 72,300 | $^1$324 <br> $^2$4,000 | .0614 | 47.3 |
| 4 | 18.8 | 2.02 | 65,000 | 0 | .0536 | 122 |
| High pressure | 4.49 | .619 | +22,200 | 0 | .0512 | 396 |

$^1$ Q<.078 ml./sec.  $^2$ Q>.078 ml./sec.

The approximate apparent viscosity range calculated by Equation 6 which a given instrument will cover having the calibration constants of Table I are listed in Table II considering a time interval of 10–100 seconds with either a one percent or ten percent change in head allowed. Since the error in measurement of the volume change ($\Delta Q$ ml.) and the elapsed ($\Delta t$ sec.) will be quite small, the error in the measurement of the apparent viscosity of the fluid will be about the same as the change in the head during the measurement.

TABLE II

| Viscometer No. | Apparent viscosity 1% change in head | | Apparent viscosity 10% change in head | |
|---|---|---|---|---|
| | $\Delta t$=10 sec. | $\Delta t$=100 sec. | $\Delta t$=10 sec. | $\Delta t$=100 sec. |
| 1 | 20 | 200 | 2 | 20 |
| 2 | 90 | 900 | 9 | 90 |
| 3 | 9 | 90 | .9 | 9 |
| 4 | 60 | 600 | 6 | 60 |

In practice three readings are required for each shear stress-shear rate value: the initial volume, final volume, and elapsed time. In addition, at the end of the run, the equilibrium volume of the fluid in the calibrated tube is observed. Equations 1 and 2 are used to find the flow rate and average pressure drop. Equations 3 and 4 are used to find the values of shear rate and shear stress for a given fluid. Normally, the calibration constants L, $A_1$ and $A_2$ are found by measuring respectively the length of the capillary tube, the area of the constant cross-sectional area recipient vessel and the volume per unit head of the calibrated efflux vessel. The diameter D of the capillary tube efflux vessel into the recipient vessel both of which are of constant cross-sectional area the formula then becomes:

$$A_1(M_1 - M_1^*) = A_2(M_2 - M_2^*) \quad (8)$$

combining Equations 7 and 8 shows that if the areas $A_1$, $A_2$ at the instantaneous heights $M_1$, $M_2$, and the difference in scale zero height $\Delta M_2^*$ are known, then the equilibrium value of the height $M_2^*$ in the efflux tube can be determined:

$$M_2^* = \frac{A_1(M_1 - \Delta M_2^*) + A_2 M_2}{A_1 + A_2} \quad (9)$$

OPERATION

In operation an assembly such as shown in FIG. 1 is chosen which will be adequate for the apparent viscosity of the fluid to be measured. The fluid is introduced into the efflux vessel 10 and by controlling the top opening of recipient vessel 14 as a level is reached at a desired calibration mark 12. Upon release of the recipient vessel top closure the fluid flows by gravity into the recipient vessel 14 through capillary 18. Using a stop watch the elapsed time between different calibrated levels 12 is observed and noted ($\Delta t$). The scale readings in ml. are observed initially $Q_2^{(1)}$ and finally $Q_2^{(2)}$ and equilibrium value $Q_2^*$. These readings are used to arrive at the calculated values of $T_w^{(3)}$ for wall shear stress and $\Gamma_w^{(4)}$ for shear rate. These values are fundamental rheological observations useful to determine apparent viscosity $T_w/\Gamma_w$ or other properties as needed.

In using the apparatus of FIG. 2 an additional reading of gas pressure applied to the efflux tube is observed ($P_g$)

in cm. of Hg. This value is entered into the wall shear stress formula:

$$T_w = \frac{D}{4L} \rho g[(1/A_1 + 1/A_2)(1/2(Q_2^{(1)} + Q_2^{(2)}) - Q_2^*) + 13.6P]$$

At high flow rates, the wall shear stress will also be modified for both apparatus by subtracting the well known kinetic energy correction $\alpha_1[(Q_2^{(1)} - Q_2^{(2)})/\Delta t]_2$ It should be understood that without departing from the spirit of the invention, various modifications may be made in the specific descriptions herein. The latter are illustrative only and are not authored in a restricting sense, it being desired that only such limitations shall be placed thereon as may be required by the state of the prior art.

What is claimed:
1. A rheometer of the outflow type, comprising, in a generally upright condition:
   a capillary tube of given diameter (D) and length (L), interconnecting on one end with a constant cross-sectioned area ($A_2$) efflux vessel having calibrations thereon, and a constant cross-sectional area ($A_1$) recipient vessel,
   the distance between calibrations on said efflux vessel determined by first solving for accuracy in measurement of head ($\delta$) from the formula:

$$\delta \mu_{a/\Delta t} = (\rho g D/4L)\left(\frac{1}{A_1} + \frac{1}{A_2}\right)\left[\left(\frac{32}{\pi D^3}\right)\left(\frac{3n'+1}{4n'}\right)\right]$$

where:
$\mu a$ = apparent viscosity
$\rho$ = density of fluid
$g$ = gravitational acceleration
$n'$ = slope of plot of $T_w$ versus log $(32/\pi D^3)$ $(dQ/dt)$, then solve for the change in instantaneous volume ($\Delta Q$) from the formula:

$$\delta = \frac{\Delta Q}{Q_2^{(1)} - \frac{1}{2}\Delta Q - Q_2^*}$$

where:
$Q_2^{(1)}$ = instantaneous volume in efflux vessel at initial time
$Q_2^*$ = equilibrium volume of efflux vessel
$\Delta Q$ = change in instantaneous volume $Q_2^{(1)} - Q_2^{(2)}$ where
$Q_2^{(2)}$ = instantaneous volume in efflux vessel at end of elapsed time $\Delta t$, then solve for the distance between said calibrations ($\Delta M_2$) from the formula:

$$\Delta M_2 = \frac{\Delta Q}{A_2}$$

the distance between calibrations ($\Delta M_1$) on said recipient vessel determined $$\Delta M_1 = \frac{\Delta Q}{A_1}$$

References Cited

UNITED STATES PATENTS

3,277,694   10/1966   Cannon et al. _____ 73—55

OTHER REFERENCES

Maron, S. H., et al.: Low Shear Capillary Viscometer With Continuously Varying Pressure Head, Journal of Applied Physics, 26(12), pp. 1457–1460, December 1955.

Holcomb, L. A.: Calibration of Kinematic Viscometers, Instruments & Control Systems, pp. 109–115, February 1964.

S. CLEMENT SWISHER, Primary Examiner

J. W. ROSKOS, Assistant Examiner